United States Patent
Parker et al.

(10) Patent No.: US 12,328,396 B2
(45) Date of Patent: Jun. 10, 2025

(54) METHOD FOR CRYPTOGRAPHIC ENGINE TO INTERFACE WITH AN ARBITRARY NUMBER OF PROCESSOR CARDS IN A SCALABLE ENVIRONMENT

(71) Applicant: Rockwell Collins, Inc., Cedar Rapids, IA (US)

(72) Inventors: Matthew D. Parker, Cedar Rapids, IA (US); Adriane R. Van Auken, Marion, IA (US); Mercer Peirce Richardson, Marion, IA (US); Keith R. Bean, Center Point, IA (US); Joseph Kaemmer, Cedar Rapids, IA (US); Neal J. Buchmeyer, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 631 days.

(21) Appl. No.: 17/009,031

(22) Filed: Sep. 1, 2020

(65) Prior Publication Data
US 2022/0069998 A1    Mar. 3, 2022

(51) Int. Cl.
| | | |
|---|---|---|
| *H04L 29/06* | (2006.01) | |
| *G06F 15/78* | (2006.01) | |
| *G06F 21/72* | (2013.01) | |
| *G06F 21/76* | (2013.01) | |
| *G06F 30/34* | (2020.01) | |
| *H04L 9/32* | (2006.01) | |
| *H04L 29/08* | (2006.01) | |
| *H04L 69/326* | (2022.01) | |

(52) U.S. Cl.
CPC ........ *H04L 9/3215* (2013.01); *G06F 15/7871* (2013.01); *G06F 21/72* (2013.01); *G06F 21/76* (2013.01); *G06F 30/34* (2020.01); *H04L 69/326* (2013.01)

(58) Field of Classification Search
CPC ... H04L 9/3215; H04L 69/326; H04L 63/166; H04L 63/04; G06F 15/7871; G06F 21/72; G06F 21/76; G06F 30/34; G06F 21/85
USPC .......................................................... 713/168
See application file for complete search history.

(56) References Cited

U.S. PATENT DOCUMENTS

| | | | |
|---|---|---|---|
| 5,970,066 A | * 10/1999 | Lowry | ................. H04M 11/062 370/446 |
| 7,213,173 B2 | 5/2007 | Chen et al. | |

(Continued)

OTHER PUBLICATIONS

Extended Search Report in European Application No. 21193909.5, dated Jan. 26, 2022, 9 pages.

(Continued)

*Primary Examiner* — Haresh N Patel
(74) *Attorney, Agent, or Firm* — Suiter Swantz IP

(57) ABSTRACT

A data radio has an arbitrary number of processors configured to interact with a single cryptographic engine or security module. Hardware strapping allows each card and processor to identify its location in a system. The static region of the field-programmable gate array contains the functionality to manage access to the backplane. Dynamic regions of the field-programmable gate array fabric are used to route the data correctly to and from the security module within a specific application. Software is deployed on any card with a generic load that is agnostic to its location and the hardware self-configures.

10 Claims, 5 Drawing Sheets

(56) References Cited

U.S. PATENT DOCUMENTS

| | | | |
|---|---|---|---|
| 7,644,289 B2 | 1/2010 | Yancy et al. | |
| 9,798,899 B1* | 10/2017 | Takahashi | G06F 21/72 |
| 10,565,670 B2 | 2/2020 | Chen et al. | |
| 2004/0143654 A1* | 7/2004 | Poirot | H04L 41/085 |
| | | | 709/223 |
| 2006/0059574 A1* | 3/2006 | Fayad | H03K 19/17768 |
| | | | 726/34 |
| 2011/0066832 A1 | 3/2011 | Casselman et al. | |
| 2015/0215236 A1* | 7/2015 | Joshi | H04L 67/1001 |
| | | | 707/754 |
| 2016/0173104 A1* | 6/2016 | Vassiliev | H03K 19/17704 |
| | | | 716/125 |
| 2016/0234095 A1* | 8/2016 | Shetty | H04L 45/02 |
| 2018/0367870 A1 | 12/2018 | Shih | |
| 2019/0199720 A1* | 6/2019 | Palli | H04W 12/08 |
| 2020/0099658 A1* | 3/2020 | Couillard | G09C 1/00 |
| 2020/0125772 A1* | 4/2020 | Volos | H04L 9/3268 |
| 2020/0187004 A1* | 6/2020 | Reimer | H04L 63/083 |

OTHER PUBLICATIONS

European Examination Report dated Dec. 5, 2023; European Application No. 21193909.5.

\* cited by examiner

METHOD FOR CRYPTOGRAPHIC ENGINE TO INTERFACE WITH AN ARBITRARY NUMBER OF PROCESSOR CARDS IN A SCALABLE ENVIRONMENT

BACKGROUND

In a network architecture with one or more security modules services a plurality of general-purpose modules, each security module may need to securely communicate with each of the general-purpose modules. Where the network architecture does not have a fixed topology, security modules and general-purpose modules may not have defined physical or logical addresses. In those situations, the network system cannot establish secure channels between security modules and general-purpose modules.

State of the art cryptographic architecture is designed with fixed hardware paths and known quantities of waveforms and processors that interface with a cryptographic security module. Data from multiple originating sources will arrive at the same physical address and thus presents a problem for the cryptographic engine. Data entering the cryptographic engine needs to be routed to the correct cryptographic algorithm and needs to be returned to the proper network address without being exposed to other locations in the network.

SUMMARY

In one aspect, embodiments of the inventive concepts disclosed herein are directed to a system having an arbitrary number of processors configured to interact with a single cryptographic engine or security module. Hardware strapping allows each card and processor to identify its location in a system. The static region of the field-programmable gate array contains the functionality to manage access to the backplane. Dynamic regions of the field-programmable gate array fabric are used to route the data correctly to and from the security module within a specific application. Software is deployed on any card with a generic load that is agnostic to its location and the hardware self-configures.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
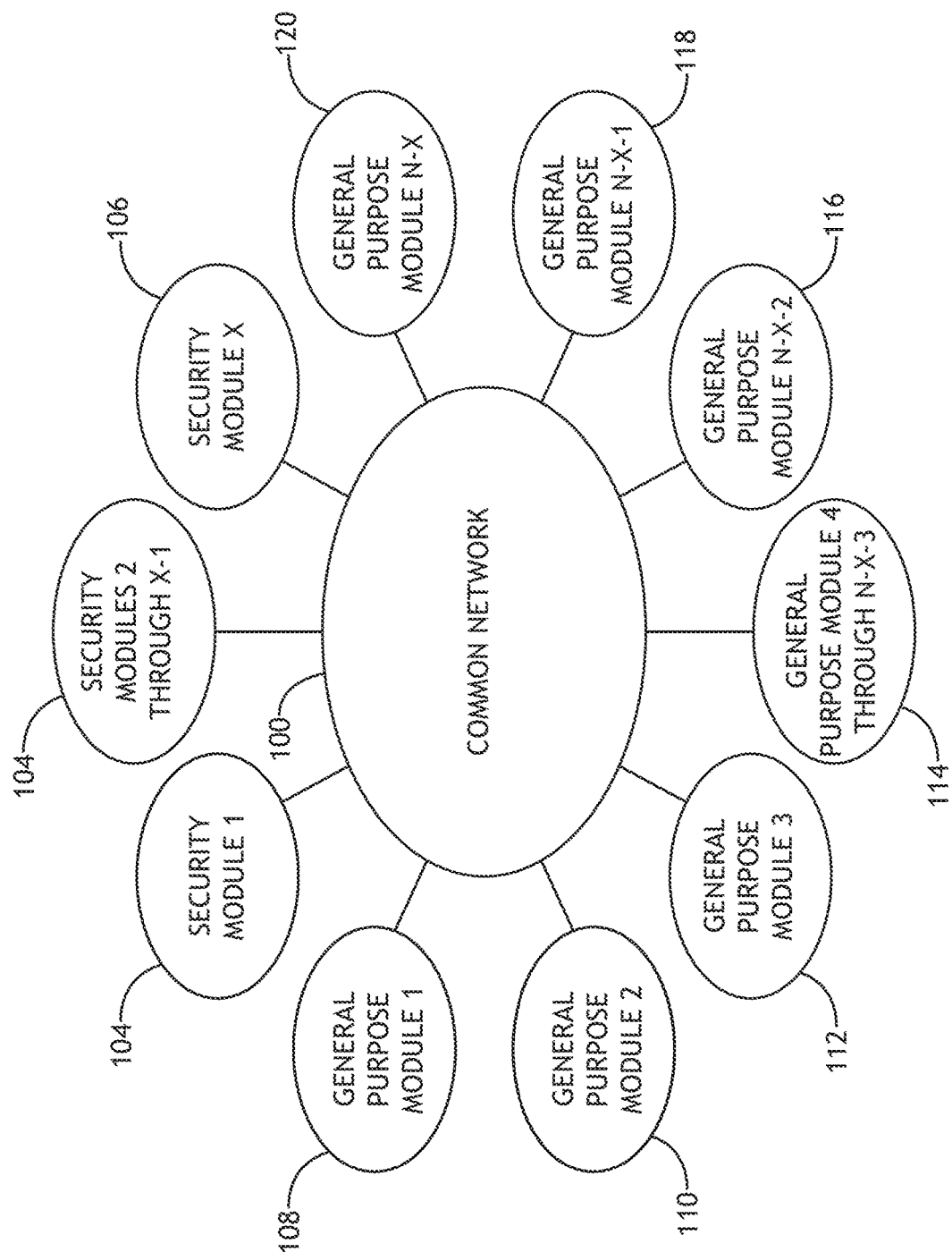
FIG. 1 shows a block diagram of a network of nodes.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system having an arbitrary number of processors configured to interact with a single cryptographic engine or security module. Hardware strapping allows each card and processor to identify its location in a system. The static region of the field-programmable gate array contains the functionality to manage access to the backplane. Dynamic regions of the field-programmable gate array fabric are used to route the data correctly to and from the security module within a specific application. Software is deployed on any card with a generic load that is agnostic to its location and the hardware self-configures.

Referring to FIG. 1, a block diagram of a network of nodes is shown. In a system where an arbitrary number of nodes are connected via a common network 100, the system comprises security processing modules 102, 104, 106 embodied in one or more nodes and general-purpose modules 108, 110, 112, 114, 116, 118, 120 embodied in one or more nodes. Each of the security processing modules 102, 104, 106 must be able to receive a communication from any of the general-purpose modules 108, 110, 112, 114, 116, 118, 120, perform the appropriate security operation on the data in the communication, and return it securely to the originator of the secure communication over any possible communication path to the other modules 102, 104, 106, 108, 110, 112, 114, 116, 118, 120 (or corresponding node). Compounding the issue for this secure communication, each of the modules 102, 104, 106, 108, 110, 112, 114, 116, 118, 120 (or corresponding nodes) can be placed in any physical or logical position with respect to the common network 100. In at least one embodiment, data communication elements embodied in the one or more nodes include a mechanism to determine the physical and/or logical location of modules 102, 104, 106, 108, 110, 112, 114, 116, 118, 120 in the common network 100, discover the network path to one of the security processing modules 102, 104, 106, and have the security processing modules 102, 104, 106 securely receive and transmit data to any of the general-purpose modules 108, 110, 112, 114, 116, 118, 120.

Figure 2:
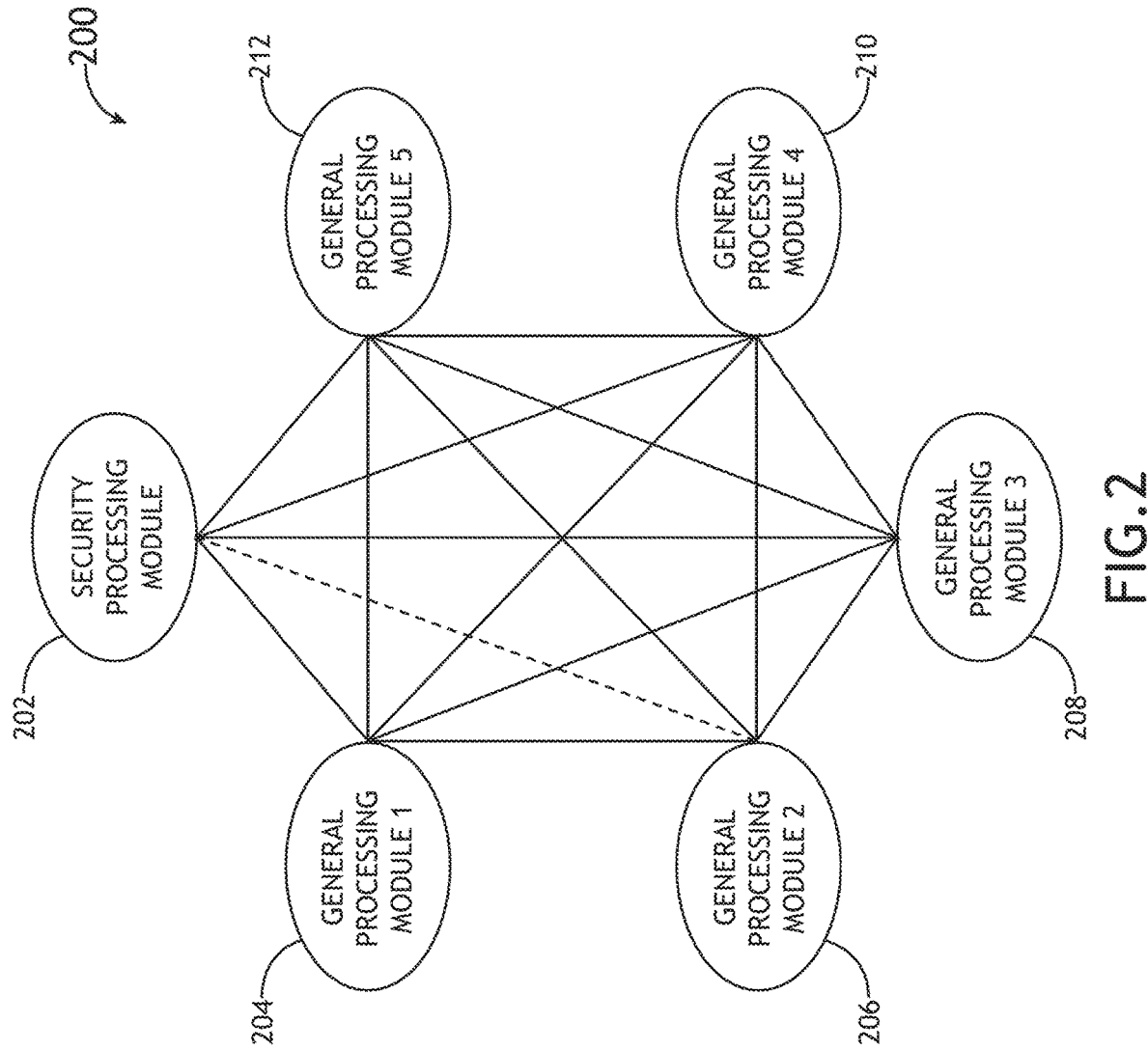
FIG. 2 shows a block diagram of a network of nodes.

Referring to FIG. 2, a block diagram of a network 200 of nodes is shown. The network 200 includes a plurality of modules 202, 204, 206, 208, 210, 212 (embodied in one or more network nodes). In at least one embodiment, the network 200 includes a single security processing module 202 and a plurality of general-purpose modules 204, 206, 208, 210, 212. A path between the security processing module 202 and a second general-purpose module 206 represents a desired secure path 214. Neither the second general-purpose module 206 nor the security processing module 202 knows its own physical or logical location in the network or the physical or logical location of the other at startup. The security processing module 202 and the second general-purpose module 206 must determine which network path to the other module is the correct common path that may be established as a desired secure path 214.

Figure 3:
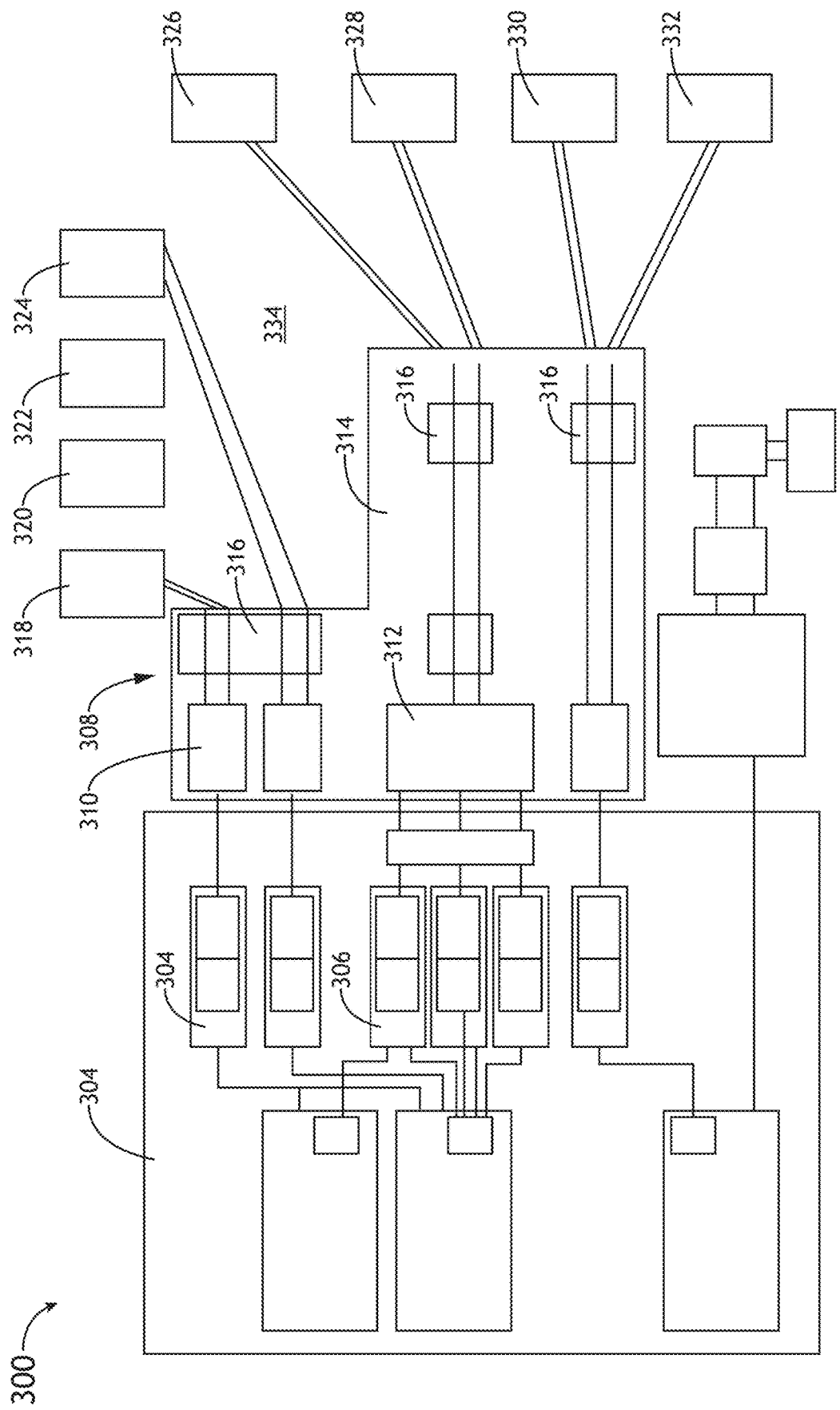
FIG. 3 shows a block diagram of a system for implementing data connections between components in a network according to an exemplary embodiment.

Referring to FIG. 3, a block diagram of a system for implementing data connections between components in a network according to an exemplary embodiment is shown. A radio according to at least one exemplary embodiment is composed of a scalable number of circuit card assemblies 300 with one or more processors 302 and field programmable gate arrays 308 on them that can host various programmability packages, including both software and firmware. Each processor 302 may define one or more interface ports 304 including cryptographic interface ports 306.

These circuit card assemblies 300 may host waveforms or other capabilities, perform the function of a security module, provide an interface between the radio and a host platform or user, etc. The field programmable gate array 308 hosts a cryptographic engine. The cryptographic engine provides data management (including keys, certificates, and algorithms), authentication, confidentiality, and integrity. It may be appreciated that any of these functions may be hosted on any other circuit card assembly 300 in the radio in addition to being hosted in the security module. Different layers of security, enabled by the available functions, may be applied based on different kinds of applications (e.g. boot, communications, storage, etc.) The field programmable gate array 308 defines a static region 334, hardware strapped to a unique identification sequence, the static region 334 comprising a plurality of peripheral transport layer interfaces 318, 320, 322, 324, 326, 328, 330, 332. Each peripheral transport layer interface 318, 320, 322, 324, 326, 328, 330, 332 is in data communication with the processor 302 (specifically the interface ports 304 and cryptographic interface ports 306) via a dynamic region 314 defined by the field programmable gate array 308, the dynamic region 314 defining a plurality of direct memory access ports 310, 312 and switch banks 316. Hardware strapping allows traffic to and from that circuit card assembly 300 to be easily identifiable and the location of the circuit card assembly 300 to be easily identifiable. The cryptographic engine may simultaneously identify and dynamically establish communication channels based on discovering locations of modules in the network.

At startup, the field programmable gate array 308 instantiates a connection between each peripheral transport layer interface 318, 320, 322, 324, 326, 328, 330, 332 and an appropriate switch bank 316. Each switch bank 316 in the dynamic region 314 of the field programmable gate array 308 is configured based on configuration hardware strapping from a static register read at startup; each static register being unique to each slot a circuit card assembly 300 may be plugged into. Each switch bank 316 is configured to provide interfaces to a security module 312 direct memory access port, and to a gateway of the radio to the host interface such that security processing and control from a user are enabled regardless of the slot in which the circuit card assembly 300 is located. Such embodiment allows software to address other processors that are connected as Ethernet connections regardless of the location of the processor 302 and circuit card assembly 300 in the radio. Whenever the cryptographic engine is used it establishes a communication channel and excludes any traffic that doesn't correspond to those hardware strapped static register addresses.

In at least one embodiment, a common security module performs cryptographic functions for waveforms transiting the circuit card assembly 300, as well as crypto variable handling. The architecture that enables the common security module is independent of the location of the hardware and nature of the waveforms hosted in the radio relative to the location of the security module. Hardware may be scaled in complexity and number of cards while still maintaining secure connection to the common security module. The common security module provides cryptographic functionality for all capabilities inside the radio.

In at least one embodiment, the circuit card assembly 300 may be configured for mesh network communications, where each circuit card assembly 300 determines its location in the mesh network so that the correct peripherals are configured to enable point-to-point communication for each component in the radio. Full interfaces between all processors are not required, or indeed for security reasons, are not allowed.

Figure 4A:
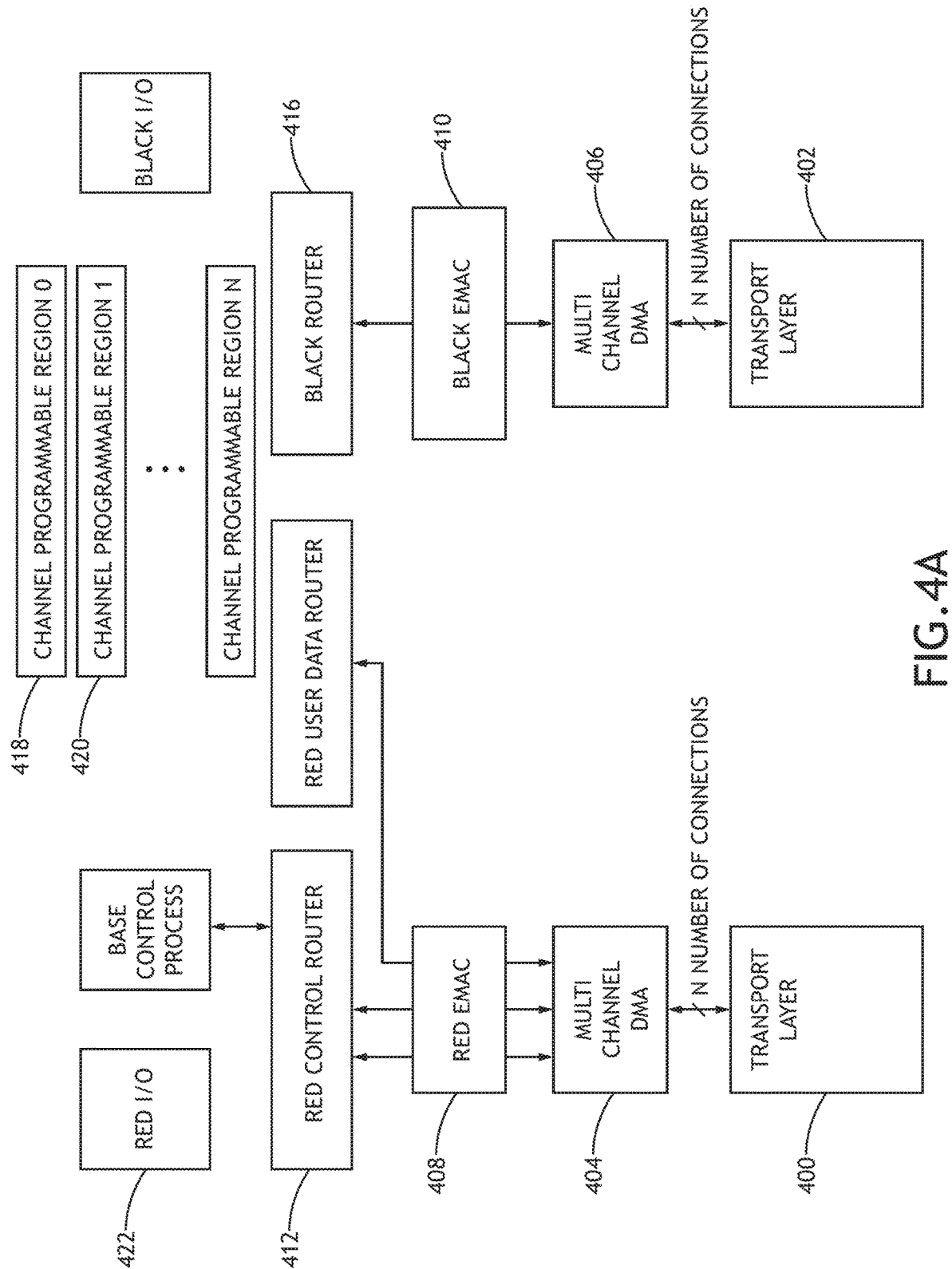
FIG. 4A shows a block diagram of a security module according to an exemplary embodiment.
Figure 4B:
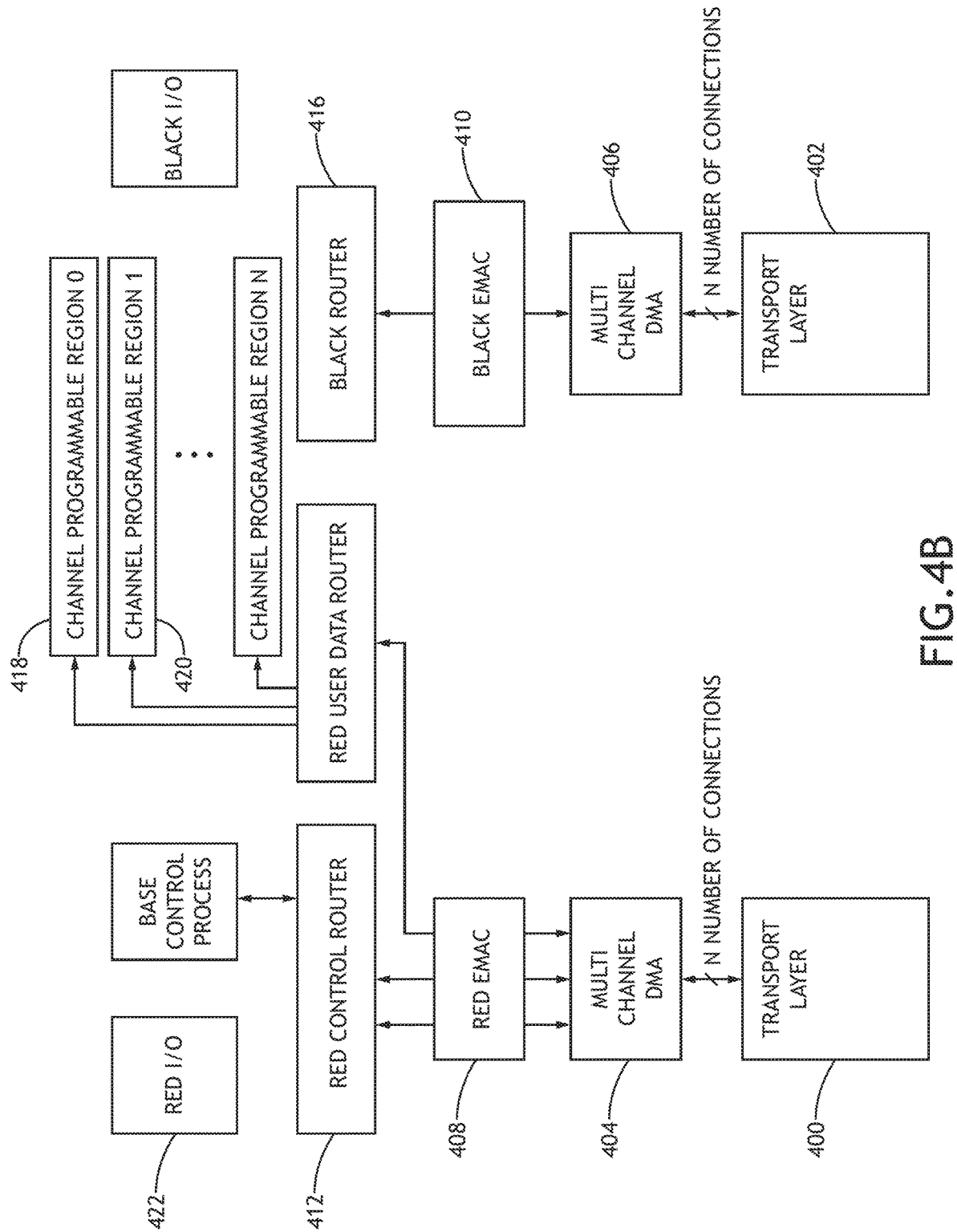
FIG. 4B shows a block diagram a security module according to an exemplary embodiment.

Referring to FIGS. 4A and 4B, block diagrams of security module interface according to an exemplary embodiment are shown. When a cryptographic channel is opened, the security module must be configured to only allow traffic through to the allowed set of interfaces (i.e., the black and red cryptographic interfaces and no others). When the security module starts (such as in FIG. 4A), cryptographic channels 418, 420 are unloaded but data routers 414, 416 and control routers 412 are partially enabled. The security module connects to a main terminal interface to allow keying and configuration commands as well as establishing interfaces to processing elements.

When a processing element is ready to create a cryptographic channel 418, 420, it sends a command to the security module to load and configure a cryptographic channel 418, 420. When the security module receives a command from a specific red interface 422, it loads the channel functionality, and also configures the data routers 414, 416 to only allow access to the cryptographic channel 418, 420 through the interface it was configured from (for example the red interface 422), plus its matching black interface, which is loaded from a configuration map stored in the security module. The configured security module (such as in FIG. 4B) may allow data traffic between the two corresponding interfaces via the configured cryptographic channel 418, but exclude any other access to the configured cryptographic channel 418. Any other traffic from any other interface cannot be sent through the configured cryptographic channel 418 regardless of direction. In at least one embodiment, no traffic may utilize any cryptographic channel 418, 420 until configuration is complete.

Between the configuration of the individual cards at startup and the auto configuring of the security module during cryptographic channel substantiation, an arbitrary number of processor cards and waveforms may interface securely with a single common security module. Hardware strapping and self-configuring of field programmable gate arrays in a data radio provides a novel method to enable scalability and reusability of the hardware inside the data radio.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A circuit card assembly comprising:
   at least one processor defining a plurality of interface ports and a plurality of cryptographic ports; and
   at least one field programmable gate array configured to host a plurality of cryptographic functions, the at least one field programmable gate array defining:
      a static region defining a plurality of transport layer interfaces; and
      a dynamic region comprising at least one switch bank configured to connect one or more of the transport layer interfaces to one or more of the plurality of interface ports, plurality of cryptographic ports, a security module direct memory access port, and a gateway radio, and each switch bank configured to be hardware strapped from a static register to a unique identification sequence corresponding to a static register address,
   wherein:
   the at least one processor is configured to:
      discover a physical and logical location of the circuit card and of a plurality of nodes on a network;
      determine secured paths between the circuit card assembly and each of the plurality of nodes;
      establish a communication channel between a first transport layer interface and a second transport layer interface via the at least one switch bank;
      apply one or more of the plurality of cryptographic functions to the communication channel; and
      exclude all traffic from the communication channel that does not correspond to one of the hardware strapped static register addresses; and
   the plurality of cryptographic functions comprises cryptographic keys, certificates, and algorithms for authentication, confidentiality, and integrity for all of the secured paths.

2. The circuit card assembly of claim 1, wherein applying the one or more of the plurality of cryptographic functions is based on application specifications of an application requesting the communication channel.

3. The circuit card assembly of claim 1, wherein the at least one processor is further configured to identify the unique identification sequence from the slot where the circuit card assembly is installed during a startup sequence.

4. The circuit card assembly of claim 3, wherein the at least one processor is further configured to receive remote unique identification sequences, each corresponding to a node connected to one of the plurality of transport layer interfaces during the startup sequence.

5. The circuit card assembly of claim 1, wherein:
   the communication channel comprises a first secure communication channel;
   the at least one processor is further configured to:
      establish a second secure communication channel between the first transport layer interface and a third transport layer interface via the at least one switch bank; and
      apply one or more of the plurality of cryptographic functions to the second secure communication channel; and
   the first secure communication channel and second communication channel utilize a common cryptographic engine but are otherwise logically isolated.

6. A method comprising:
   receiving a request from a requesting node to establish a secure communication channel between the requesting node and a target node;
   discovering a physical and logical location of a circuit card and of a plurality of nodes on a network;
   determining secured paths between the circuit card assembly and each of the plurality of nodes;
   establishing a communication channel between a first transport layer interface and a second transport layer interface, each defined by a static region of a field programmable gate array, via at least one switch bank in a dynamic region of the field programmable gate array, the at least one switch bank configured to connect one or more of the transport layer interfaces to one or more of the plurality of interface ports, plurality of cryptographic ports, a security module direct memory access port, and a gateway radio, and each switch bank configured to be hardware strapped from a static register to a unique identification sequence corresponding to a static register address;
   applying one or more cryptographic functions to the communication channel; and
   excluding all traffic from the communication channel that does not correspond to one of the hardware strapped static register addresses, wherein the one or more cryptographic functions comprises cryptographic keys, certificates, and algorithms for authentication, confidentiality, and integrity for all of the secured paths.

7. The method of claim 6, wherein applying the one or more of the plurality of cryptographic functions is based on application specifications of an application requesting the communication channel.

8. The method of claim 6, further comprising identifying the unique identification sequence during a startup sequence.

9. The method of claim 8, further comprising receiving remote unique identification sequences, each corresponding to a node connected to a transport layer interface during the startup sequence.

10. The method of claim 6, wherein:
- the communication channel comprises a first secure communication channel;
- the method further comprises:
    - establishing a second secure communication channel between the first transport layer interface and a third transport layer interface via the at least one switch bank; and
    - applying one or more of the plurality of cryptographic functions to the second secure communication channel; and
- the first secure communication channel and second communication channel utilize a common cryptographic engine but are otherwise logically isolated.

\* \* \* \* \*